June 12, 1945.  A. RAPPL  2,378,103
WINDOW OPERATOR
Filed Jan. 2, 1943
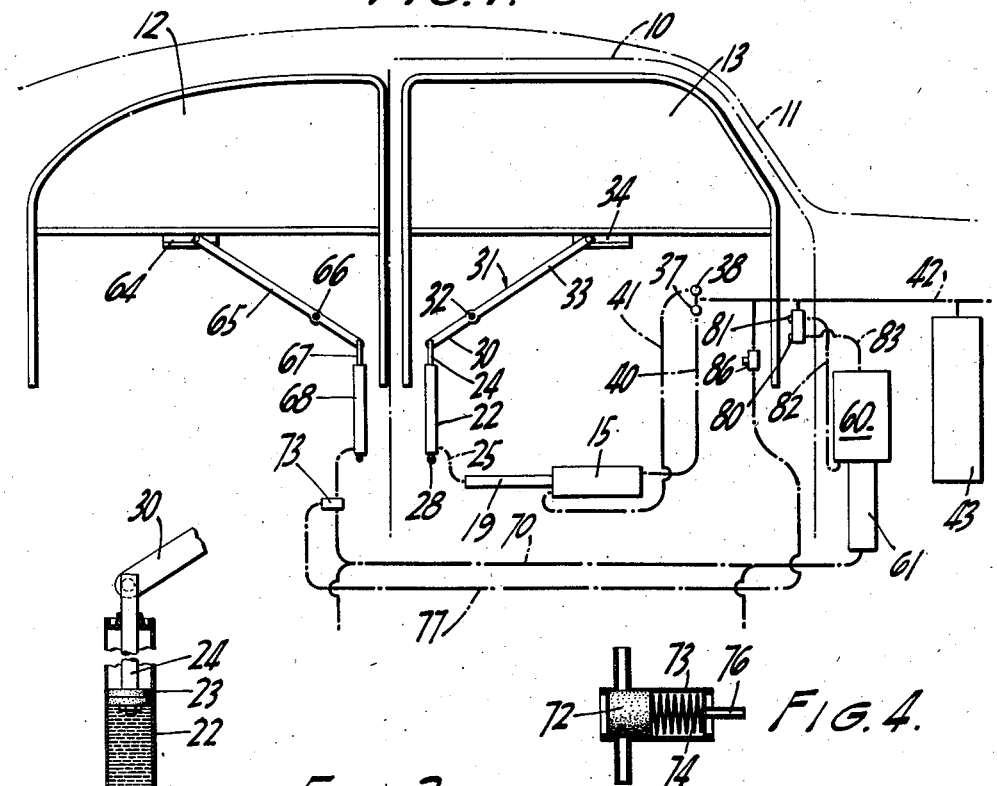
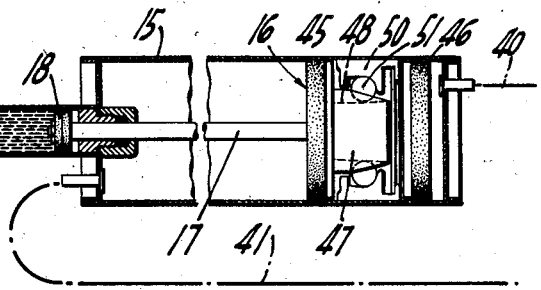
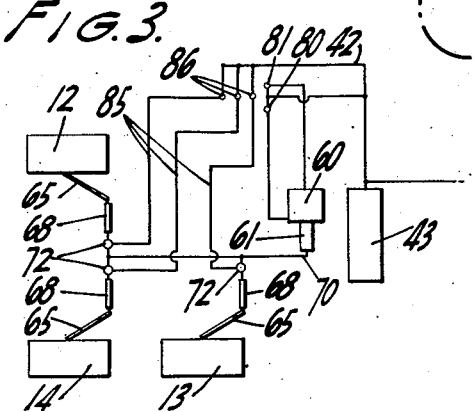
INVENTOR
Anton Rappl
BY
Bean, Brooks, Buckley & Bean
ATTORNEYS Patented June 12, 1945

2,378,103

UNITED STATES PATENT OFFICE 2,378,103

WINDOW OPERATOR

Anton Rappl, Buffalo, N. Y., assignor to Trico Products Corporation, Buffalo, N. Y.

Application January 2, 1943, Serial No. 471,149

2 Claims. (Cl. 268—125)

This invention relates to motor controlled vehicle closure operators.

Various forms of motor controlled vehicle closure systems have been proposed, particularly with respect to controlling the condition of windows of vehicles. The present invention provides a new system of controlling vehicle closures by the employment of a novel arrangement of fluid pressure motor means.

The use of differential fluid pressure for effecting opening and closing movements of vehicle windows has heretofore been proposed. The present invention provides a novel combination of fluid motors which permits the generation of very substantial fluid pressure forces through the use of differential piston and cylinder arrangements.

In one form of the invention a fluid motor comprising a cylinder and piston of substantial area is associated with a piston and cylinder of much smaller effective cross sectional area in such manner that the two pistons move conjointly. Since the force of the large piston is a function of the unit fluid pressure applied thereto and the area of the head of the piston, the total force applied thereby to the small piston is such as to produce a very much higher unit pressure in the smaller cylinder. This much higher unit pressure may then be transmitted by suitable fluid conduits to a motor associated more or less directly with window or other closure opening and closing mechanism.

A signal advantage of procedure in accordance with the principles here referred to is that the relatively large prime mover may be located wherever convenient. In one instance set forth herein by way of example, the prime mover is located remotely from the vehicle window, as, for instance, on the dash of the vehicle. In another instance illustrate herein the prime mover is located within a vehicle door which has associated therewith a window to be opened and closed by the instant motive means. In the case of location of the prime mover in a vehicle door, advantage is found in being able to locate the relatively large prime mover in a part of the door which is remote from the window and which is inherently of greater accommodating capacity than the portion of the door more immediately adjacent the window.

A further advantage of the employment of the principles of this invention is found in the ability to use a single relatively large prime mover for selectively controlling any one of a plurality of vehicle closures.

In the exemplary embodiments shown herein the prime mover is actuated by the application thereto of differential air or other gaseous pressure. In the case of an automotive vehicle, this source of differential pressure may be the subatmospheric pressure of the vehicle's intake manifold, or any other suitable pressure generator found in association with the vehicle. With further reference to the embodiments set forth herein by way of example, the smaller cylinder, whose piston is actuated by the prime moving piston, is preferably provided with a relatively incompressible fluid and accordingly any suitable hydraulic medium is provided.

In the drawing:

Fig. 1 is a schematic side elevational view of a portion of a motor vehicle body showing front and rear side windows thereof;

Fig. 2 is a longitudinal cross sectional view through one form of the fluid pressure closure operator of the present invention;

Fig. 3 is a schematic view showing the arrangement of fluid pressure conduits employed in the other herein illustrated form of closure operator, and Fig. 4 is a detailed cross sectional view through a fluid pressure operated valve of the second mentioned embodiment.

Throughout the several figures of the drawing and the ensuing description, like characters of reference denote like parts. In the illustrated instance the form of the present invention in which the prime mover is located in a vehicle door is shown in association with what would be the front left door 10 of vehicle 11 and the form of the present invention wherein the prime mover is remote from the window or windows to be controlled whereby is shown in connection with a rear window 12 which may or may not be located in a door, and this same prime mover is intended to control the two right side windows of the vehicle in a manner which is illustrated schematically in Fig. 3 and which will presently appear.

Referring first to the front left door 10 of the vehicle, which has a window 13 supported for vertical sliding opening and closing movement, the prime mover is shown as comprising a cylinder 15 and a piston designated generally 16 in Fig. 2.

The piston 16 is specially designed to lock itself against movement in one direction excepting when the moving force is in the form of a fluid pressure differential at opposite sides thereof. The construction for effecting this end and the reason for its desirability will appear hereinafter.

The piston 16 has a co-axial piston rod 17 which extends through an end wall of the cylinder 15 and terminates in a substantially smaller piston 18 disposed in a cooperating cylinder 19. In the illustrated instance the cylinders 15 and 19 are secured in direct endwise abutment but the cylinders may be spaced if desired.

The pump cylinder 19 has fluid communication with a motor cylinder 22, having a piston 23 and a piston rod 24 associated therewith, by means of a fluid conduit 25. It is preferred that the column of fluid between the pistons 18 and 23, such fluid being contained in the cylinder 19, the conduit 25 and the cylinder 22, be incompressible, particularly in view of the substantial unit pressures which are imposed thereon by reason of the present pressure build-up arrangement. For this reason the fluid employed is preferably a non-corrosive hydraulic medium such as oil or the like.

The lower end of the cylinder 22 is pivotally mounted against a portion of the vehicle door 11 as at 28. The piston rod 24 extends outwardly from the upper end of the cylinder 22 and terminates in pivotal engagement with the outer end of an arm 30 of a lever 31 which is pivotally secured to the door 11 as at 32. An opposite arm 33 of the lever 31 may engage pivotally and slidably in a horizontal track 34 which is fixed to the window 13. The proportions of the arms 30 and 33 of the lever 31 may be varied to suit conditions but it will be noted that the substantial forces which the relatively small motor cylinder 22 may develop permits the use of a relatively short arm 30 and a resultingly relatively short structure in the case of both the motor cylinder 22 and the pumping cylinders 19 with its associated motor cylinder 15. Operation is controlled by depressing either of a pair of buttons 37 and 38.

Under ordinary conditions when neither of the buttons 37 or 38 is being operated, both ends of the cylinder 15 are maintained under sub-atmospheric fluid pressure by virtue of a pair of conduits 40 and 41 which communicate with the opposite ends of the cylinder and with a common sub-atmospheric fluid pressure supply conduit 42. The buttons 37 and 38 control three-way valves (not shown) in the conduits 40 and 41 respectively. Beginning with the parts in the position illustrated in Figs. 1 and 2, depression of the button 37 closes the conduit 40 from communication with the supply conduit 42 and simultaneously vents the conduit 40 to the atmosphere. Accordingly, atmospheric pressure entering the right hand end of the partially evacuated motor cylinder 15 through the conduit 40 moves the piston 16 to the left as viewed in Figs. 1 and 2. This results in an impulse of equal total force against the hydraulic column of the cylinders 19 and 22 and the conduit 25, which causes the lever 31 to pivot in a clockwise direction and open the window 13 by downward movement thereof.

As soon as the button 37 is released it again establishes the normal valve position wherein both conduits 40 and 41 tend to evacuate the opposite ends of the motor cylinder 15. The manner in which depression of the button 38 of the conduit 41 operates to effect closing movement of the window 13 is believed to be clear from the foregoing since it is merely a reversal of the window-opening operation.

In the illustrated instance the cylinder 15 is approximately three times the effective diameter of the cylinders 19 and 22 and since the effective area of the cylinder 15 is nine times that of the cylinders 19 and 22 the unit fluid pressure in the hydraulic column of the cylinders 19 and 22 and of conduit 25 will be nine times as great as the applied unit fluid pressure in the motor cylinder 15. The reduction in size of the cylinders 19 and 22, particularly the latter, which this mechanical advantage affords is obvious.

The source of the sub-atmospheric fluid pressure of the conduit 42 is not shown but may be the intake manifold of the propelling internal composition engine of the vehicle or any other suitable source or generator of differential fluid pressure. A pressure storage reservoir is interposed in the conduit 42 in the illustrated instance, as at 43.

The piston 16 of the prime mover cylinder 15 is composed of a pair of opposed annular cup leather packings 45 and 46 which face away from each other. The packing 45 has a hub 47 provided with ball seats 48 which flare outwardly from the axis of the cylinder in their extent away from the packing 45. The packing 46 is provided with a segmental cage 50 which confines a circular pair of balls 51 which rest on the ball seats 48. The several segments which make up the cage 50 are confined by the cylinder 15 to maintain the generally annular form of the cage 50.

If an attempt be made to open the window 13 by a force applied directly thereto, the attempted clockwise pivoting of the lever 31 will exert a pull on the piston rod 17 through the medium of the hydraulic column of cylinders 19 and 22. This pull moves the packing 16 and its hub 47 to the left as viewed in Fig. 2, and causes the ball seats 48 to cam outwardly against the balls 51, which expands the segmental cage 50 radially against the inner periphery of the cylinder 15 and locks the entire piston assembly against axial movement. The foregoing construction does not interfere with free movement of the piston 16 in either direction under the impetus of fluid pressure acting against the outer face of either of the cup leather packings 45 and 46.

In the alternative form of window operator shown associated with the rear window 12 in Fig. 1, the prime moving pneumatic cylinder is designated 60 and its adjacent hydraulic cylinder is designated 61. The cooperation of these cylinders and their interior construction may correspond with that of the cylinders 15 and 19 of the previously described embodiment. As in the former case the rear window 12 is provided with a horizontal track 64 pivotally and slidably engaged by one arm of a lever 65 having a fixed pivot as at 66. The other arm of the lever 65 connects with a piston rod 67 of a motor cylinder 68 which is mounted and arranged similarly to the motor cylinder 22.

A common hydraulic column is established between the cylinders 61 and 68 by a conduit 70 but this conduit is normally closed by a plug valve 72 (see Fig. 4) which is housed in a cylinder 73 interposed in the conduit 70. The valve 72 is normally held in conduit-interrupting position by a compression coil spring 74 but one end of the cylinder 73 has fluid connection with the sub-atmospheric pressure supply by means of a nipple 76 and a connecting conduit 77 which extends to the conduit 42. When sub-atmospheric pressure is applied to the interior of the cylinder 73 the plug valve 72 is withdrawn from its interrupting position and fluid communication between the cylinders 61 and 68 is free and open.

In Fig. 1 the numerals 80 and 81 designate control buttons which correspond in function to the buttons 37 and 38, respectively, at the left front door 11. Under ordinary conditions, when neither of the buttons 80 or 81 is being operated, both ends of the cylinder 60 are maintained under sub-atmospheric fluid pressure through conduits 82 and 83 which communicate with the opposite ends of the cylinder and with the sub-atmospheric fluid pressure supply conduit 42. Depression of the button 80 vents the upper end of the cylinder 60 to the atmosphere resulting in a downward movement of the piston therein and of the piston in the pump cylinder 61. This is accompanied by upward movement of the piston in the motor cylinder 68 and consequent lowering of the window 12, all as previously described in connection with the front door 11. Closing movement of the window 12 is accomplished by depression of the button 81 which effects a reversal of the just-described operation.

Referring to the schematic showing of Fig. 3, the left rear window is designated 12 as in Fig. 1, and front rear right windows are designated 13 and 14 respectively. Each window is provided with an operating lever 65 and a hydraulic motor cylinder 68. The supply conduit is indicated at 42 and the reservoir at 43. The hydraulic conduit 70 leading from hydraulic pump cylinder 61 has branches communicating with each of the ex-motor cylinders 68 and in each branch there is interposed a valve 72 which is schematically indicated. Individual suction conduits for controlling each of the valves 72 are designated 85. These conduits 85 all lead from the sub-atmospheric pressure supply conduit 42 and each has a control valve 86 interposed therein.

The valves 86 may be of conventional construction and each has a manipulating control button or the like disposed within easy reach of the operator of the vehicle, as, for instance, on the instrument panel. The valves 86 are normally closed so that mere manipulation of either the window raising button 81 or the window lowering button 80 will be ineffective since each of the branches of the conduit 70 to the three motor cylinders 68 is stopped by a valve 72. If, however, any one of the three valves 86 is manually opened at the same time that either of the buttons 80 or 81 is depressed, the conduit 85 to its associated valve 72 will be energized and that valve will be opened to render the hydraulic cylinder between the pump cylinder 61 and the particular motor cylinder 68 effective. In this manner any desired one of the windows 12, 13 and 14 may be selectively raised or lowered and in fact by manual simultaneous opening of more than one of the valves 86 and manipulation of either of the buttons 80 and 81 several or all of the windows 12, 13 and 14 may be simultaneously raised or lowered.

The mechanical advantage attained by the cylinder arrangement of this embodiment of the system is similar to that described in the first embodiment.

While several specific embodiments of the instant invention have been shown and described, it is to be understood that the underlying principles of the invention are not limited thereto or otherwise than as defined by the appended claims.

What is claimed is:

1. Window operating mechanism comprising, in combination with a window and a source of operating pressure, a fluid pressure motor having a chamber and a piston slidable therein, hydraulic means operatively connecting the piston to the window, means to effect an operative fluid pressure differential on the piston to adjust the window toward and from a closed position, and window actuated means in the form of an expansible and contractible clutch within the chamber and operable through the hydraulic connecting means to lock the piston and thereby hold the window in its adjusted position, said locking means being rendered inoperative by and during fluid imparted movement of the piston.

2. Window operating mechanism comprising, in combination with a window and a source of operating pressure, a fluid pressure motor having a chamber and a piston slidable therein, hydraulic means operatively connecting the piston to the window, means to effect an operative fluid pressure differential on the piston to adjust the window toward and from a closed position, and window actuated means in said chamber and operable through the hydraulic connecting means to lock the piston and thereby hold the window in its adjusted position, said locking means being rendered inoperative by and during fluid imparted movement of the piston.

ANTON RAPPL.